(12) United States Patent
Chau et al.

(10) Patent No.: US 12,321,730 B2
(45) Date of Patent: Jun. 3, 2025

(54) OPTIMIZING COMPUTER-BASED COMPILATION

(71) Applicant: International Business Machines Corporation, Armonk, NY (US)

(72) Inventors: Dickson Wui Fai Chau, Markham (CA); Nicole Khoun, Whitby (CA); Muiez Ahmed, North York (CA); Ahsan Saghir, Cambridge (CA)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 17/930,161

(22) Filed: Sep. 7, 2022

(65) Prior Publication Data
US 2024/0078099 A1   Mar. 7, 2024

(51) Int. Cl.
G06F 8/41 (2018.01)
(52) U.S. Cl.
CPC .................................. G06F 8/443 (2013.01)
(58) Field of Classification Search
CPC ........................................... G06F 8/443
USPC .................................. 717/151–161
See application file for complete search history.

(56) References Cited

U.S. PATENT DOCUMENTS

| | | | |
|---|---|---|---|
| 8,910,114 B2 * | 12/2014 | Loenko | G06F 8/443 717/154 |
| 9,477,451 B1 | 10/2016 | O'Farrell | |
| 2010/0077387 A1 * | 3/2010 | Callaghan et al. | G06F 8/443 717/140 |
| 2014/0067884 A1 * | 3/2014 | Tata | G06F 16/1805 707/822 |
| 2014/0258996 A1 | 9/2014 | Brackman | |
| 2019/0034178 A1 * | 1/2019 | Goetz et al. | G06F 8/443 |
| 2020/0183669 A1 | 6/2020 | Mola | |
| 2021/0133193 A1 | 5/2021 | Mcconnell | |

* cited by examiner

*Primary Examiner* — Ted T. Vo
(74) *Attorney, Agent, or Firm* — Joseph P. Curcuru

(57) ABSTRACT

In an approach to improve computer-based compilation, embodiments of the present invention determine if there is an entry in a metadata file for a compilation command request. Further, in response to determining there is no entry in the metadata file, embodiments execute a first process, wherein the first process comprises: initiating a compilation for a compilation unit; and determining the compilation has made a change to an input program within or below a predetermined threshold. Additionally, embodiments, determine that a compiler option used to disable an optimization is identified, record the compiler option to disable the optimization in the metadata file, and disable the optimization based on the compiler option to disable in the metadata file.

20 Claims, 6 Drawing Sheets

```
-------------------------------------------------------------------------
REQUESTED COMPILATION COMMAND
my-c-compiler myfile.c  -o myfile.o  -opt-level=3

COMPILER VERSION
vers1

OPTIMIZED COMPILATION COMMAND
my-c-compiler myfile.c -o myfile.o -opt-level=3 -disable-optimization1
-disable-optimization2 -disable-optimization3

OPTIMIZATIONS TO DISABLE NEXT COMPILATION
-disable-optimization1
-disable-optimization2
-disable-optimization3

COMPILATION TIME
10m 15s

OPTIMIZATIONS TO DISABLE WITHOUT DISABLE OPTIONS
optimization4
optimization5
optimization6
-------------------------------------------------------------------------
REQUESTED COMPILATION COMMAND
my-c-compiler myfile.c  -o myfile.o  -opt-level=4

COMPILER VERSION
vers1

OPTIMIZED COMPILATION COMMAND
my-c-compiler myfile.c  -o myfile.o  -opt-level=4 -disable-optimization7

COMPILATION TIME
9m 49s

OPTIMIZATIONS TO DISABLE NEXT COMPILATION
-disable-optimization7

OPTIMIZATIONS TO DISABLE WITHOUT DISABLE OPTIONS
optimization4
optimization5
optimization6
optimization8
```

FIG. 2

OPTIMIZING COMPUTER-BASED COMPILATION

BACKGROUND OF THE INVENTION

The present invention relates generally to computer-based compilation, and more particularly to the field of improving computer-based compilation based on historic metadata.

A compiler is a computer program that translates a source program written in some high-level programming language (such as C/C++) into machine code for some computer architecture (such as z/Architecture). On the other hand, an interpreter is a computer program that translates a source program written in some high-level programming language into machine code line by line during execution. A compiler will see the source program as a whole and therefore has greater opportunity to evaluate and optimize the code before execution. Compiler optimization is a pattern matching exercise that undergoes a sequence of transformations to produce a semantically equivalent output program, which ideally uses fewer resources or executes faster. Traditional compilers (such as Clang) typically have set pipelines for what optimizations occur and in which order. Compiler developers may tune these pipelines to maximize the performance of specific user experiences. The chosen list and order of optimizations may not be the best choice for every use, leading to extra time doing the pattern matching with no matches. In turn, this comes at the expense of compile time with no benefit. Compilers take as input compilation units. A compilation unit is commonly a file or a set of files, but it can be a subset of a file or even something more abstract like modules. What constitutes a compilation unit is determined by language and compiler implementation. Compilers consume compilation units to produce the appropriate machine code. Modern applications typically consist of many compilation units. These compilation units will generally contain a variety of code that may benefit from compiler optimizations differently. To produce an optimal application, the user may wish to compile different compilation units with a different set of compilation options. Since these options will affect the compilation unit as a whole, the invention operates on compilation units.

SUMMARY

Embodiments of the present invention disclose a computer-implemented method, a computer program product, and a system, the computer-implemented method comprising: determining if there is an entry in a metadata file for a compilation command request; responsive to determining there is no entry in the metadata file, executing a first process, wherein the first process comprises: initiating a compilation for a compilation unit; and determining the compilation has made a change to an input program within or below a predetermined threshold; determining that a compiler option used to disable an optimization is identified; recording the compiler option to disable the optimization in the metadata file; and disabling the optimization based on the compiler option to disable in the metadata file.

BRIEF DESCRIPTION OF THE DRAWINGS

FIG. 2 illustrates an example of a metadata file for a compilation unit, in accordance with an embodiment of the present invention;

DETAILED DESCRIPTION

Figure 1:
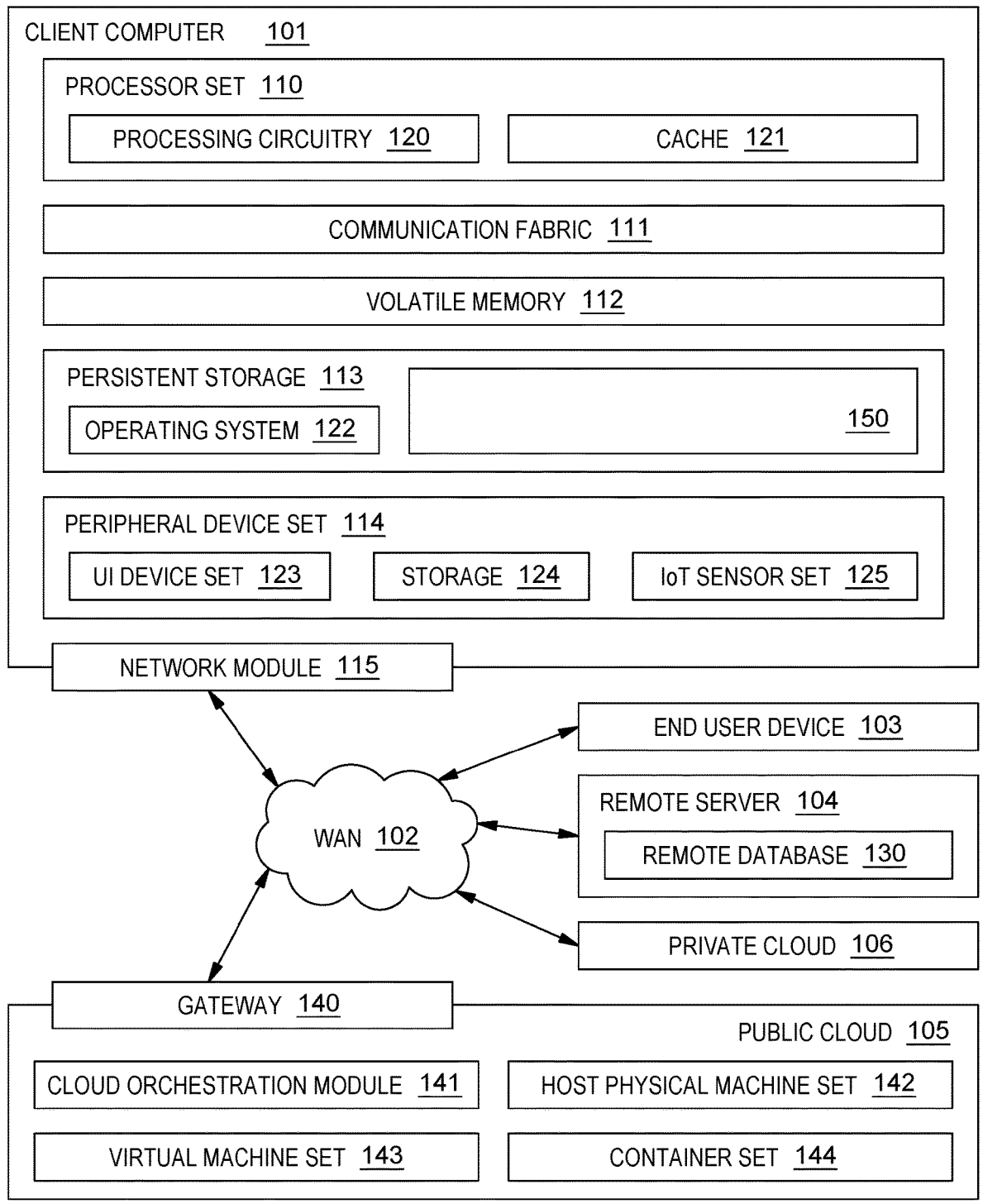
FIG. 1 is a functional block diagram illustrating a distributed data processing environment, executing an improved compilation program, in accordance with an embodiment of the present invention.

Embodiments of the present invention recognize that statically compiled languages are at a disadvantage for compile time when compared to dynamically compiled languages. The quality and the speed of the program execution is very important for the entire life cycle of the application, which is at the expense of the compile time, for static compilers. Further, embodiments of the present invention recognize that software development is mostly an interactive process where a developer would add or change some functionalities, then compile and test, and repeat. Thus, embodiments of the present invention recognize that during this process, the compiler is mostly compiling code that is somewhat similar to the last version of the code. Therefore, embodiments of the present invention recognize that, in many cases, an optimization that did not have a significant impact in a previous compilation will continue to have no significant impact in future compilations.

Further, embodiments of the present invention recognize that compiler optimization is a pattern matching exercise (at compile-time). However, embodiments of the present invention recognize that matching more patterns doesn't necessarily yield better code (i.e., faster code at run-time). Additionally, if the compiler is looking for code eligible for a specific optimization and that optimization cannot be applied to the input source program, that is compile time wasted with no benefit. Moreover, embodiments of the present invention recognize that over the course of development of the program, this additional time spent running optimizations with little to no benefit can add up, leading to less productivity. Embodiments of the present invention recognize that developers are not generally willing to wait a long time for a compilation as it hinders productivity. Hence, embodiments of the present invention solve at least the particular problems stated above by improving the compile time in the space of compiler optimizations.

Additionally, embodiments of the present invention improve the art and solve at least the problems stated above by collecting and consuming metadata during a compilation to identify optimizations that do not have a significant impact on the input source program and skipping optimizations that do not significantly modify the source program leads to improved compile time without impacting execution performance. More specifically, embodiments of the present invention improve the art and solve at least the problems stated above by (i) creating a metadata file for the compilation unit in response to a determination no existing metadata file is associated with a compilation unit of a compilation request, (ii) determining whether there is an entry in the metadata file for a compilation command requested, in response to a determination an existing metadata file is associated with the compilation unit of the compilation request, (iii) adding an entry for the compilation command requested to the metadata file, in response to a determination there is no entry in the metadata file for the compilation command requested, (iv) invoking a first process comprising: recording in the metadata file the compilation command requested and additional compiler information including compiler version, initiating compilation for the compilation unit including start timing and determining, for each optimization run in the compilation, whether a change is made to an input program, (v) determining whether a compiler option used to disable the optimization is identified, in response to a determination the optimization run made changes below a predetermined threshold, determining whether a compiler option used to disable the optimization is identified, (vi) recording optimization information in the metadata file in a list of options to add to a next compilation in response to a determination an option to disable the optimization is identified, and determining to record the optimization information in the metadata file in a list of optimizations that made no change but cannot be disabled in response to a determination there is no option to disable the optimization, (vii) responsive to completion of the compilation, recording the time taken between the start time and stop time for the compilation in the metadata file, (viii) responsive to determining there is an entry in the metadata file for the compilation command requested, invoking a second process comprising: recording in a new temporary metadata file the compilation command requested and the additional compiler information including the compiler version, copying the list of optimizations that expressed no benefit in a last compilation and have no disable options from an original metadata file to the new temporary metadata file, and collecting from the original metadata file, a list of options to disable the optimizations that expressed no benefit exceeding a predetermined threshold in the last compilation, (ix) appending the option to the optimized compilation command stored in the new metadata file in response to a determination the original metadata file contains an optimized compilation command, for each option collected which is not in the optimized compilation command, (x) appending all the options collected for the compilation command requested stored as the optimized compilation command in the new metadata file in response to a determination the original metadata file does not contains an optimized compilation command, and (xi) proceeding to the next optimization, in response to completion of the compilation, recording time taken between the start timing and the stop timing for the compilation in the new metadata file, replacing the entry for the compilation command requested in an original metadata file with the optimized compilation command in the new metadata file and deleting the new metadata file.

Implementation of embodiments of the invention may take a variety of forms, and exemplary implementation details are discussed subsequently with reference to the Figures (i.e., FIG. 1-FIG. 5).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as improved compilation program (component) 150. In addition to component 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in component 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Component 150 enables any number of compilation units to be re-compiled efficiently by avoiding unnecessary optimizations in individual compilation units. Component 150 may capture information or details ("metadata") from the last compilation (e.g., most recently completed compilation) and applies the captured metadata to the next compilation (for the same compilation unit) to help reduce compile time, without sacrificing the quality and efficiency of the generated code. On the next compilation of the compilation unit, the compiler may learn from the last compilation and skip the optimizations that did not yield any benefit. In various embodiments, if there are no changes to the internal representation of the code or the changes are less than some threshold (for example, 0.1%) the optimization could be disabled the next time the compilation is requested, which will reduce compile time without affecting the overall execution performance. Component 150 utilizes metadata collection and utilization for each compilation unit. Metadata may be collected for each compilation and fed into the next compilation associated with the same compilation unit. Component 150 may consume the metadata to produce a new compilation command to execute that, wherein the new compilation command may skip unnecessary optimizations.

In various embodiments, component 150 is applied when the user or a build system requests recompilation. Generally, recompilation would be requested due to changes in the program source or in a dependency, though this is not always the case. Even if there are changes to the program source, the metadata may still be valid. If there have been considerable changes to the source program or any dependency, the user may decide they do not wish to use the previously collected information. Typically, development teams are running functional and performance testing during the development cycle of their program. It is possible a change, big or small, can alter the program source enough that the metadata might be less useful. In these cases, the user may want to either completely disable component 150 for the next compilation or decide to only recollect information on the next compilation. Component 150 may also be used across multiple compiler versions of a compiler if desired. However, porting of the metadata files will be required if there were compiler invocation changes or changes to compiler options. The user must also be willing to risk that optimizations and compiler options may act differently or become unsupported in newer versions.

In various embodiments, the compiler, not depicted in FIG. 1, component 150 is being applied to may comprise the following features or functionalities: (i) use modular functions or passes for optimization that can be turned on or off on demand through the use of options, and (ii) the ability to identify if an optimization made changes to the source program. The options to disable optimizations may be explicit in the compiler manual and some compilers may even provide a mapping functionality to retrieve the toggle options for an optimization. Note not all optimizations may have a toggle option. Component 150 may be applied to a valid source code and is not restricted in regard to features or constructs within the source code.

Component 150 utilizes metadata files it produces and consumes. Metadata files may collect the following: (i) original compilation details (e.g., compilation command, compiler release, etc.), (ii) new, optimized compilation command used by component 150, (iii) the length of time the compilation took to complete, (iv) a list of compiler options to disable optimizations that did not make any significant modifications to the source program (optimizations that did not benefit the source program), and/or (v) a list of compiler optimizations that did not make any modifications to the source program but do not have an option to disable. The collected metadata file information may be useful to compiler developers because component 150 may highlight optimizations that they might want to deactivate, verify they are implemented correctly, tune, etc. Additionally, the collected metadata file information may be valuable to users if they are explicitly requesting certain optimizations in their compilation command that do not meet the change threshold. Component 150 may provide an enhanced compilation by collecting and consuming metadata during a user's compilation to identify optimizations that do not have an impact on the input source program, and thus improving compilation time in compiler optimizations based on historical metadata.

In various embodiments, component 150 determines if there is an entry in a metadata file for a compilation command request. Responsive to determining there is no entry in the metadata file, component 150 executes a first process, wherein the first process comprises: initiating a compilation for a compilation unit, and determining the compilation has made a change to an input program within or below a predetermined threshold, wherein the first process further comprises: recording, in the metadata file, the compilation command requested and additional compiler information including compiler version. In various embodiments, component 150 determines that a compiler option used to disable an optimization is identified, records the compiler option to disable the optimization in the metadata file, and disables the optimization based on the compiler option to disable in the metadata file. Responsive to determining there is no existing metadata file associated with the compilation unit for a compilation request, component 150 creates a new metadata file for the compilation unit, and responsive to determining there is no entry for the compilation command request, component 150 adds an entry to the new metadata file for the compilation command request.

In various embodiments, responsive to determining the metadata file for the compilation command request comprises the entry, component 150 executes a second process comprising: recording in a new temporary metadata file the compilation command request and additional compiler information, wherein the compiler information comprises: a compiler version, copying a list of optimizations that expressed no benefit in a previous compilation, and have no disable options from an original metadata file to the new temporary metadata file and, wherein the second process further comprises: collecting from the original metadata file, a list of options to disable the optimizations that expressed no benefit exceeding a predetermined threshold in a previous compilation. Responsive to determining an original metadata file comprises an optimized compilation command, component 150 may append the option to the optimized compilation command stored in a new meta data file. Component 150 may proceed to a next optimization in an optimization queue, record time taken between a start time and a stop time for the compilation in the new meta data file in responsive to completing the compilation and replace the entry for the compilation command requested in an original meta data file with the optimized compilation command in the new meta data file and deleting the new meta data file. Component 150 may integrate the metadata directly into the byte code or elsewhere, wherein component 150, use an additional, separate file to integrate the metadata. Component 150 may collect information about compilers and compilations of compilation units, wherein the metadata component 150 is storing is historical as opposed to specific source code data. In various embodiments, component 150 collects information about a compilation command, and uses the collected data to improve the compilation time of a future compile as opposed to emulation execution time.

FIG. 2 depicts a template that describes what a metadata file could look like. This example uses completely abstract details only for the purpose of providing a visual example. FIG. 2 depicts a metadata file for a "C" compilation unit called "myfile.c." It contains two entries for two different compilation commands. The first entry shows what metadata might look like the first-time component 150 is applied to a compilation. The second entry shows what metadata might look like after component 150 has collected and consumed metadata to produce and use an optimized compilation command. In various embodiments, component 150 is triggered when the user or a build system issues a compilation command for a compilation unit. Component 150 will then choose which process to follow as described below in FIG. 3.

Figure 3:
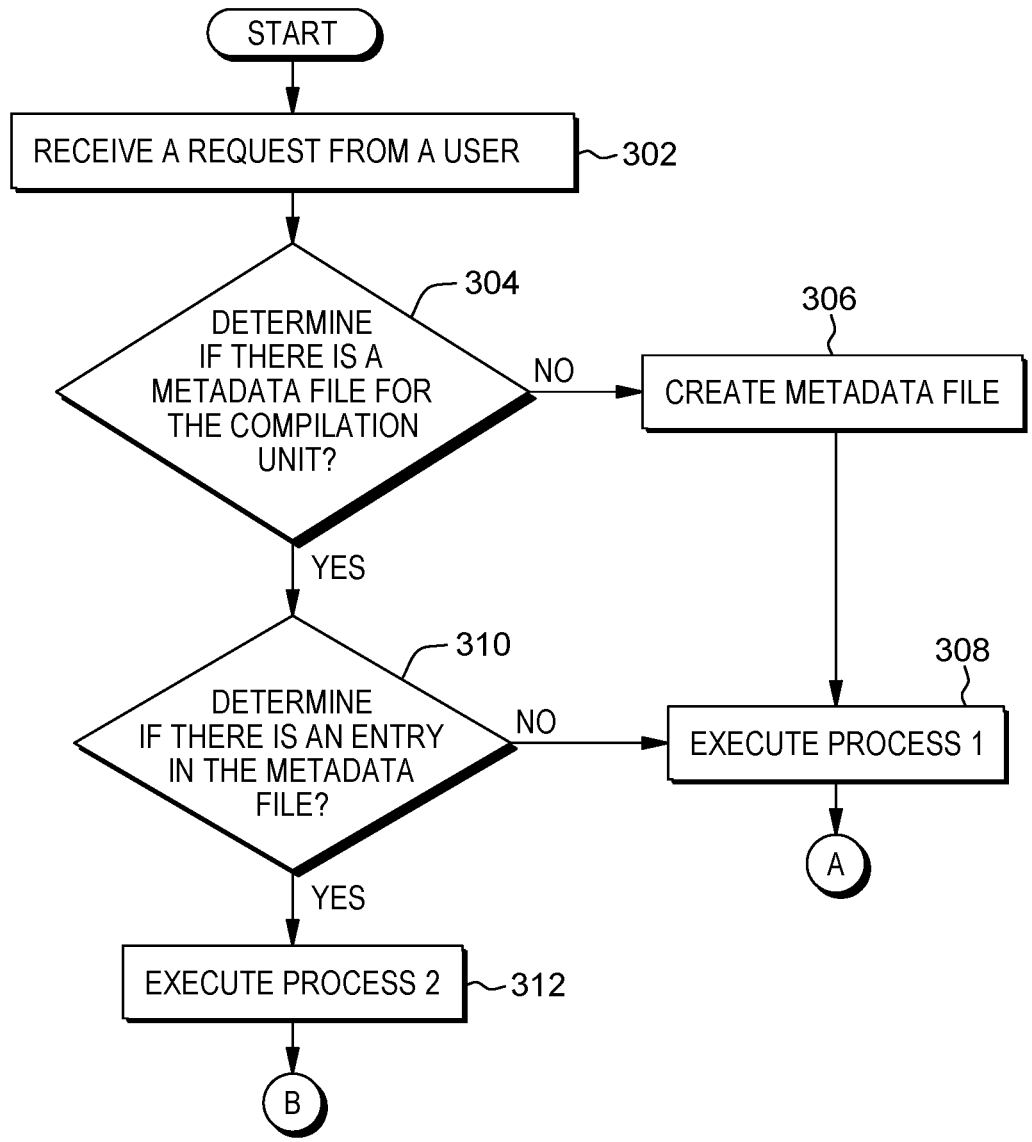
FIG. 3 illustrates operational steps of the improved compilation program, on a server computer within the distributed data processing environment of FIGS. 1, in accordance with an embodiment of the present invention.

FIG. 3 illustrates operational steps of component 150, generally designated 300, in communication with client computer 101, remote server 104, private cloud 106, EUD 103, and/or public cloud 105, within distributed data processing environment 100, for identifying which process to execute to improve compilation time based on historical metadata, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 302, component 150 receives a request from a user. In various embodiments, component 150, via a compilation unit, receives a compilation request from a user, wherein the request being submitted by the user is a compilation command. An example of the requested compilation command is demonstrated by the "Requested compilation command" line in FIG. 2 (the meta data file example): my-c-compiler myfile.c-o myfile.o-opt-level=4.

In step 304, component 150 determines if there is a metadata file. In various embodiments, component 150 determines if there is a metadata file for the compilation unit. The metadata file may be named after the compilation unit with a unique extension. For example, if the compilation unit is "myfile.c" then the meta data file will "myfile.md" or an equivalent known and understood in the art, wherein the metadata file is published to the same location as the output of the compilation command. In various embodiments, the metadata management may be predetermined or personalized by a user. In the depicted embodiment, if component 150 determines there is at least one metadata file for the compilation unit (Yes step) then component 150 advances to step 310. However, in the depicted embodiment, if component 150 determines there are no metadata files for the compilation unit (No step) then component 150 advances to step 306. A user may request recompilation of a compilation unit with a different compilation command than previous. If there is an existing metadata file but there is not an entry in it for the requested compilation command, component 150 will also follow Process 1. Each time the user requests compilation for the same compilation unit with a different compilation command, an entry will be added to the metadata file for the requested compilation command. This allows component 150 to track and optimize each compilation request separately.

Figure 4:
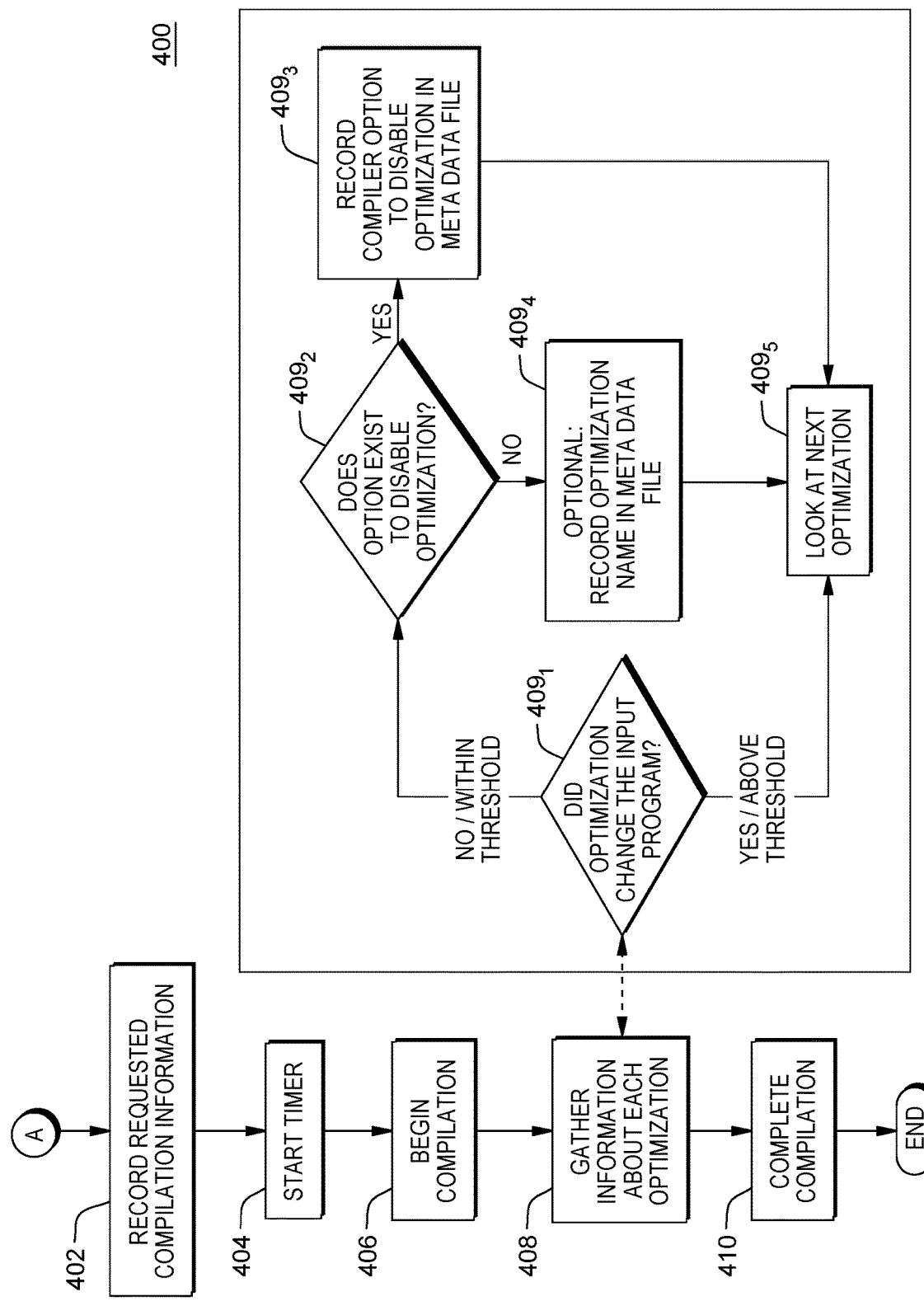
FIG. 4 illustrates operational steps of the improved compilation program, on a server computer within the distributed data processing environment of FIGS. 1, in accordance with an embodiment of the present invention.

In step 306, component 150 creates a metadata file. In various embodiments, responsive to identifying that there are no metadata files for the compilation unit, component 150 creates a metadata file and advances to step 308. If there is no existing metadata file, component 150 will have nothing to consume and will only collect information for the next time recompilation of that compilation unit with the specified compilation options is requested. In these cases, component 150 will follow Process 1 which is depicted in FIG. 4.

In step 308, component 150 executes metadata collection process (process 1). Process 1 collects metadata and is executed if one of the conditions is satisfied: (a) Metadata does not exist for the compilation unit, or (b) a metadata file exists for the compilation unit, but no metadata exists in the file for the specific requested compilation command.

In step 310, component 150 determines if there is an entry in the metadata file for the compilation command. In the depicted embodiment if component 150 determines there is at least one entry in the metadata file (Yes step) then component 150 advances to step 312. However, in the depicted embodiment, if component 150 determines there are no entries in the metadata file (No step) then component 150 executes process 1.

In step 312 component 150 executes consume and collect metadata process (process 2). If a metadata file exists for the compilation unit, and there is metadata in it for the requested compilation command, component 150 will attempt to consume it and apply it to the compilation. In this case, component 150 would execute Process 2, depicted in FIG. 5. Process 2 is further described in FIG. 5.

FIG. 4 illustrates operational steps of component 150, generally designated 400, in communication with client computer 101, remote server 104, private cloud 106, EUD 103, and/or public cloud 105, within distributed data processing environment 100, for improving compilation time based on historical metadata, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, component 150 records the requested compilation information. In various embodiments, component 150 records in the metadata file the requested compilation command and any additional compiler information desired (e.g., compiler version).

In step 404, component 150 starts the timer. In various embodiments, component 150 initiates a time once the requested is recorded or when the compilation begins.

In step 406, component 150 begins the compilation based on the compilation request. In various embodiments, component 150 initiates the compilation, via the compilation unit.

In step 408, component 150 gathers information associated with an optimization. In various embodiment, component 150 collects predetermined information associated with each executed optimization. The collection of predetermine information is further detailed in steps $409_1$-$409_5$.

In step $409_1$, component 150 determines if an executed optimization changed the input program. In various embodiments, component 150, during compilation, for each optimization run, identifies if an executed/performed optimization made any changes to the input program, wherein changes to the input program are measured based on a predetermined threshold. In various embodiments, component 150 if determines the optimization did not make any significant changes (e.g., changes below or within a predetermined threshold), then component 150 checks for a compiler option that can be used to disable the optimization. In the depicted embodiment, if component 150 identifies that no changes were made or changes within a predetermined threshold were made to the input program (No step) then component 150 advances to step $409_2$. However, in the depicted embodiment, if component 150 identifies that changes were made or changes above a predetermined threshold were made to the input program (Yes step) then component 150 advances to step $409_5$.

In step $409_2$, component 150 determines if there is an option to disable the optimization. In various embodiments, component 150 determines if there is an option to disable the optimization, record it in the metadata file in the list of options to add to the next compilation. In the depicted embodiment, if component 150 determines that there are options to disable the optimization (Yes step) then component 150 advances to step $409_3$; however, if component 150 determines there is no option to disable the optimization (No step) then component 150 advances to step $409_4$.

In step $409_3$, component 150 records the compiler. In various embodiments, component 150 records the compiler option to disable the optimization in the metadata file. For example, referring back to FIG. 2, component 150 determined "optimization1" could be disabled so component 150 added "-disable-optimization1" to the metadata file under heading "OPTIMIZATIONS TO DISABLE NEXT COMPILATION".

In step $409_4$, component 150 records the optimization name in the metadata file. In various embodiments, responsive to determining there are no options to disable the optimization, component 150 records the optimization name in the metadata file in the list of optimizations that made no change but cannot be disabled.

In step $409_5$, component 150 looks at the next optimization. In various embodiments, component 150 identifies, retrieves, and/or inspects the next optimization in a queue, wherein the "optimization queue" is predetermined. For example, in a compiler technology like LLVM, the compiler will execute an optimization pipeline based on the input options from the compilation command. If the invention was applied to a similar compilation technology, the implementer of the invention would use this pipeline as the "queue" mentioned here, collecting data on each optimization as it's run in the pipeline.

In step 410, component 150 completes the compilation. In some embodiments, once a compilation completes, component 150 stores the time it took for the compilation in the metadata file.

Figure 5A:
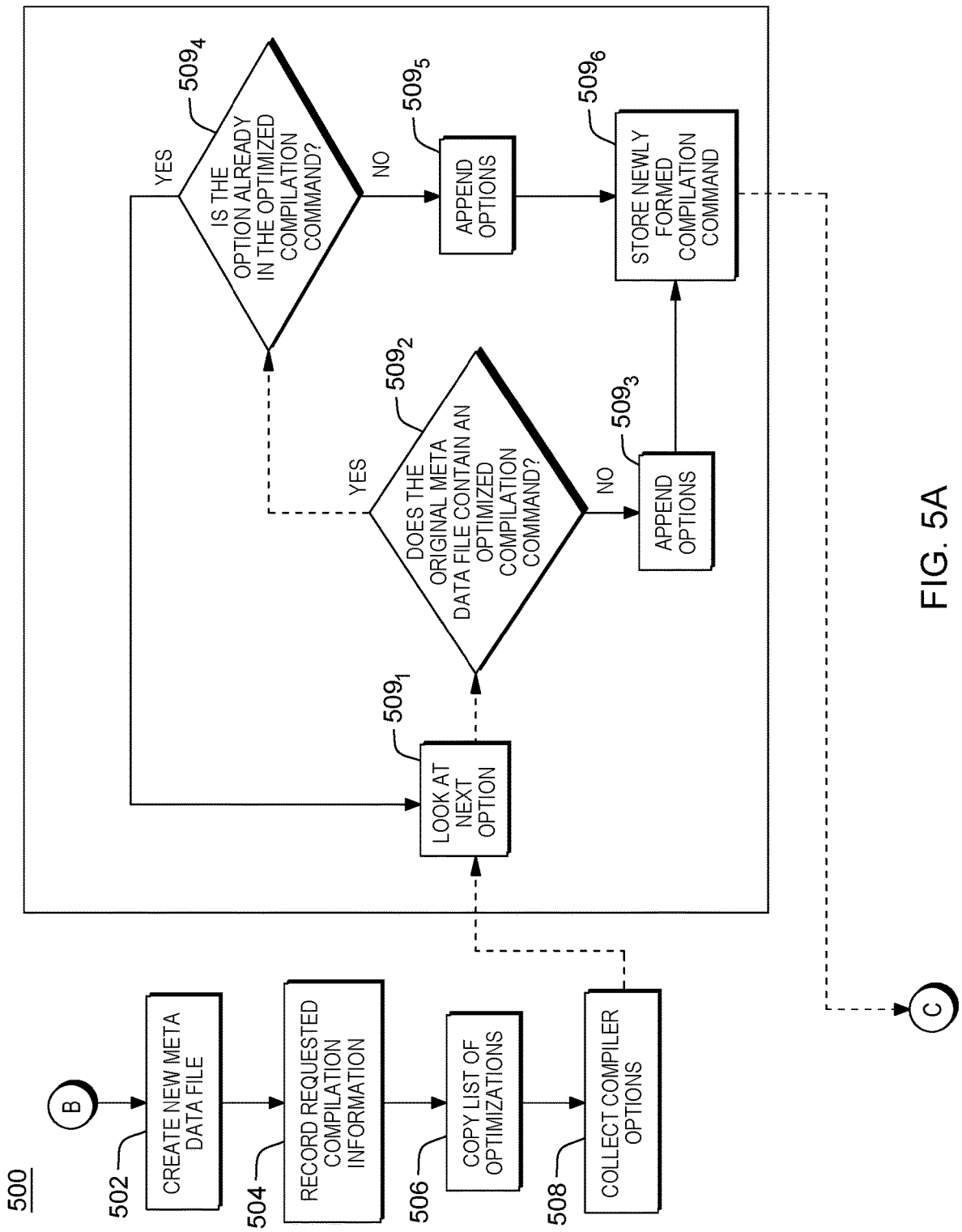
FIG. 5A and FIG. 5B illustrate operational steps of the improved compilation program, on a server computer within the distributed data processing environment of FIGS. 1, in accordance with an embodiment of the present invention.
Figure 5B:
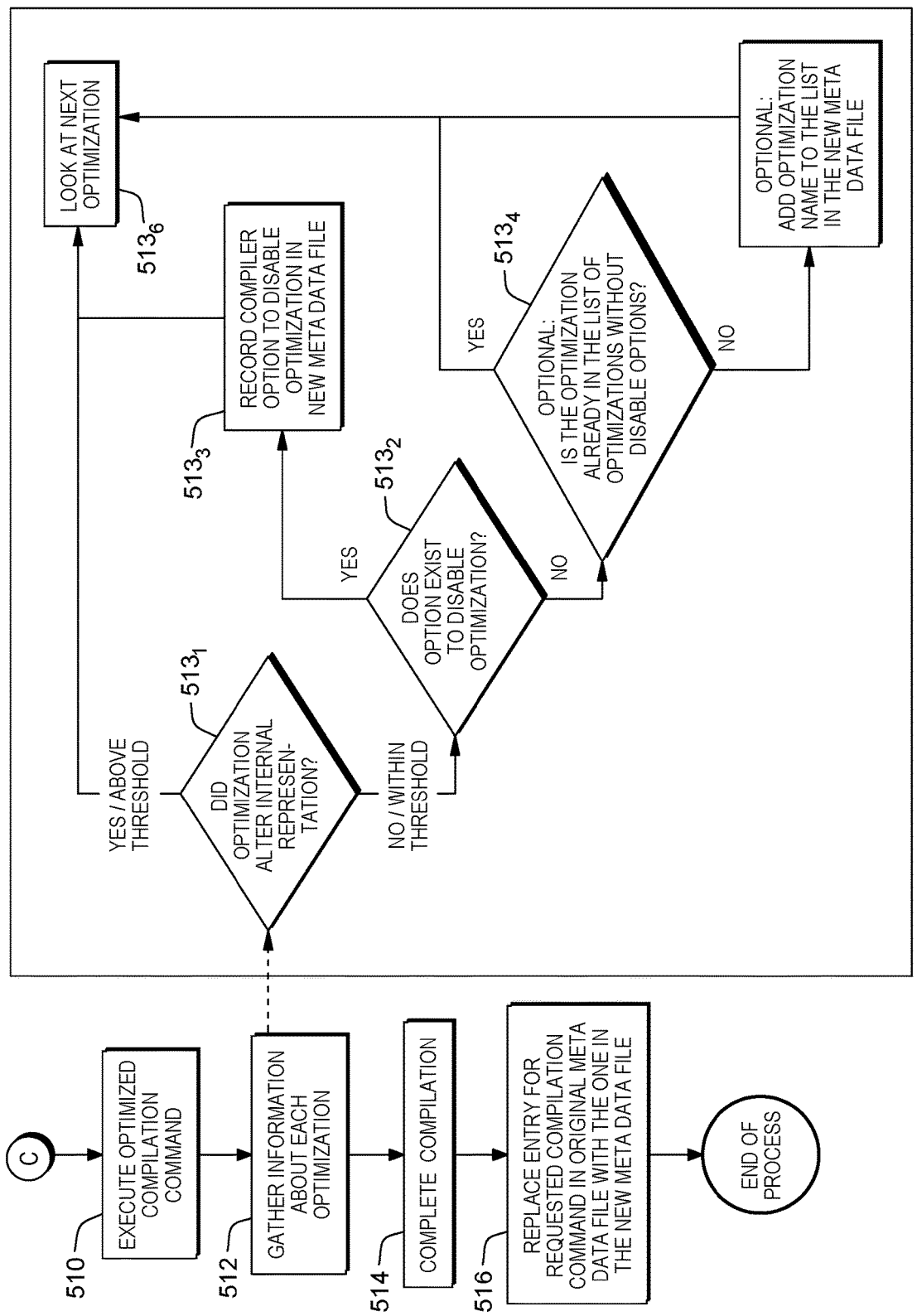

FIG. 5A and FIG. 5B illustrate operational steps of component 150, generally designated 500, in communication with client computer 101, remote server 104, private cloud 106, EUD 103, and/or public cloud 105, within distributed data processing environment 100, for improving compilation time based on historical metadata, in accordance with an embodiment of the present invention. FIG. 5A and FIG. 5B provide an illustration of one implementation and does not imply any limitations with regard to the environments in which different embodiments may be implemented. Many modifications to the depicted environment may be made by those skilled in the art without departing from the scope of the invention as recited by the claims.

In step 502, component 150 creates a new metadata file. In various embodiments, component 150 creates one or more temporary metadata files. Component 150 may create a new temporary, empty, metadata file, wherein throughout execution of Process 2 the new metadata file receives, and stores data/content associated with metadata. In various embodiments, once Process 2 is complete, the contents of the newly created metadata file will overwrite the corresponding entry in the original metadata file. Then the "new, temporary" metadata file is deleted. In various embodiments, component 150 loops over each entry in the "OPTIMIZATIONS TO DISABLE FOR NEXT COMPILATION" section and determines if the entry should be appended to the new compilation command. If the option is already in the compilation command, it doesn't need to be added again.

In step 504, component 150 records requested compilation information. In various embodiments component 150 records the requested compilation command and any additional compiler information desired (e.g., compiler version) in the new metadata file.

In step 506, component 150 copies a list of optimizations. In various embodiments, component 150 copies a list of predetermined or previously executed optimizations. Component 150 may copy the list of optimizations that expressed no benefit in a previous compilation but don't have disable options from the original metadata file to the new temporary metadata file.

In step 508, component 150 gathers the compiler options. In various embodiments, component 150 collects the compiler options for the optimizations to disable based on the original metadata file. Component 150 may collect, from the original metadata file, one or more list of options to disable the optimizations that expressed no significant benefit in the last compilation, which is further detailed in steps $509_1$-$509_6$.

In step $509_4$, component 150 looks at next option. In various embodiments, component 150 examines the next option on the list of options to disable the optimizations.

In step $509_2$, component 150 determines if the original metadata file contains an optimized compilation command. In various embodiments, component 150 identifies whether the original metadata file contains an optimized compilation command. In the depicted embodiment, if component 150 determines the original metadata file contains an optimized compilation command (Yes step) then component 150 advances to step $509_4$. However, in the depicted embodiment, if component 150 determines the original metadata file does not contain an optimized compilation command (No step) then component 150 advances to step $509_3$.

In step $509_3$, component 150 appends the options to request compilation command. In various embodiments, responsive to determining the original metadata file does not contain an optimized compilation command, component 150 appends the options collected in Step 508 to the user's requested compilation command and stores the appended options as the optimized compilation command in the new metadata file.

In step $509_4$, component 150 determines if the original metadata file contains an optimized compilation command. In various embodiments, responsive to determining the original metadata file contains an optimized compilation command, component 150 identifies if the contents (i.e., options) are in the optimized compilation command, appends the contents to the command, and stores the appended contents to the command as the optimized compilation command in the new metadata file. In the depicted embodiment, if component 150 determines there is a present or previously used option in the optimized compilation command (Yes step) then component 150 advances to step $509_1$. However, in the depicted embodiment, if component 150 determines there are no present or previously used options in the optimized compilation command (Yes step) then component 150 advances to step $509_5$.

In step $509_5$, component 150 appends the options to the optimized compilation command. In various embodiments, component 150 creates a new compilation command by appending the options on the list of options to disable the optimizations to the optimized compilation command.

In step $509_6$, component 150 stores the newly formed compilation commands. In various embodiments, component 150 stores the newly created compilation commands as optimized compilation command in a new metadata file. In some embodiments, component 150 updates a previously existing metadata file by storing the newly created compilation commands as optimized compilation command in the previously existing metadata file.

In step 510, component 150 executes the optimized compilation command. In various embodiments, component 150 executes the optimized compilation command created in step $509_6$ and starts a timer corresponding to the executed command.

In step 512, component 150 collects information associated with an optimization. In various embodiment, component 150 collects predetermined information associated with each executed optimization. The collection of predetermine information is further detailed in steps $513_1$-$513_6$.

In step $513_1$, component 150 determines if the optimization altered an internal representation of the input program. In various embodiments, component 150, during compilation, for each optimization run, determines if the executed optimized compilation command (optimization) made any changes to the input program, wherein changes to the input program are measured based on a predetermined threshold. In various embodiments, component 150 if determines the optimization did not make any significant changes (e.g., changes below or within a predetermined threshold), then component 150 checks for a compiler option that can be used to disable the optimization. In the depicted embodiment, if component 150 identifies that no changes were made or changes within a predetermined threshold were made to the input program (No step) then component 150 advances to step 513₂. However, in the depicted embodiment, if component 150 identifies that changes were made or changes above a predetermined threshold were made to the input program (Yes step) then component 150 advances to step 513₆.

In step 513₂, component 150 determines if there is an option to disable the optimization. In various embodiments, component 150 determines if there is an option to disable the optimization, record it in the metadata file in the list of options to add to the next compilation. In various embodiments, if the optimization did not make any significant changes, check for a compiler option that can be used to disable the optimization. In the depicted embodiment, if component 150 determines that there are options to disable the optimization (Yes step) then component 150 advances to step 513₃; however, if component 150 determines there is no option to disable the optimization (No step) then component 150 advances to step 513₄.

In step 513₃, component 150 records the compiler. In various embodiments, component 150 records the compiler option to disable the optimization in the metadata file. For example, referring back to FIG. 2, component 150 determined "optimization1" could be disabled so component 150 added "-disable-optimization1" to the metadata file under heading "OPTIMIZATIONS TO DISABLE NEXT COMPILATION."

In step 513₄, component 150 determines if the optimization is listed in the list of optimizations without a disable option. In the depicted embodiment, if component 150 determines that the optimization is listed in the list of optimizations without a disable option (Yes step) then component 150 advances to step 513₆. However, if component 150 determines that the optimization is not listed in the list of optimizations without a disable option (No step) then component 150 advances to step 513₅. In various embodiments, if component 150 identifies that there is an option to disable the optimization, then component 150 records the option in the metadata file in the list of options to add to the next compilation.

In step 513₅, component 150 adds the optimization name to the list in the new metadata file. In various embodiments, responsive to determining there is no option to disable the optimization, optionally check the list in the new metadata file of optimizations that made no change but cannot be disabled, wherein if the optimization is in the list, proceed to the next optimization, or if the optimization is not in the list, add the optimization name to the list and proceed to the next optimization.

In step 513₆, component 150 looks at the next optimization on the list of optimizations. In various embodiments, component 150 identifies, retrieves, and/or inspects the next optimization in a queue, wherein the "optimization queue" is predetermined. For example, in a compiler technology like LLVM, the compiler will execute an optimization pipeline based on the input options from the compilation command. If the invention was applied to a similar compilation technology, the implementer of the invention would use this pipeline as the "queue" mentioned here, collecting data on each optimization as it's run in the pipeline.

In step 514, component 150 completes the compilation. In various embodiments, component 150 is notified that the compilation is complete or completes the compilation, wherein component 150 stops the timer and stores the compilation time (i.e., the time it took for the compilation to complete) in the new metadata file. The stored time may be an optional field. In various embodiments, the stored time is not necessarily consumed by the component 150 but could be informational to the reader of the file. For example, it gives the user a metric of how long a given compile command might take to run.

In step 516, component 150 replaces the entry for the requested compilation command. In various embodiments, component 150 replaces the entry for the requested compilation command in the original metadata file with the one just created in the new metadata file by this process. In various embodiments, component 150 looks at any existing data for a compilation command, and uses it if it exists, and collects data during compilation to be used in the next one. Component 150 may determine if there is existing metadata for the compilation and if there is, try to apply what it learned from last compile. Then component 150 may run the optimized compilation command and collect data again to be used for the next compile. In some embodiments, component 150 may delete the new metadata file to avoid data duplication since the new metadata file contents are added to the original metadata file. In various embodiments, a user may explicitly request an optimization by including the option to enable that specific optimization in their compilation command. If desired, component 150 could be implemented to emit a warning and skip disabling those optimizations even if they have no significant impact on the code. Alternatively, in various embodiments, a user could control this themselves by removing the disabled option for the optimization from the "optimized compilation command."

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining if there is an entry in a metadata file for a compilation command request; and
   responsive to determining there is no entry in the metadata file, executing a first process, wherein the first process comprises:
      initiating a compilation for a compilation unit;
      determining the compilation has made a change to a source program within or below a predetermined threshold;
      determining that a compiler option used to disable an optimization is identified;
      recording the compiler option to disable the optimization in the metadata file to a list of options to add and use in a next compilation;
      utilizing the compilation command to collect data during compilation to be used in a subsequent optimization in a queue, wherein the collected metadata is utilized to highlight optimizations to deactivate; and
      disabling the optimization based on the compiler option to disable in the metadata file.

2. The computer-implemented method of claim 1, further comprising:
   responsive to determining there is no existing metadata file associated with the compilation unit for a compilation request, creating a new metadata file for the compilation unit; and
   responsive to determining there is no entry for the compilation command request, adding an entry to the new metadata file for the compilation command request.

3. The computer-implemented method of claim 1, wherein the first process further comprises:
   recording, in the metadata file, the compilation command requested and additional compiler information including compiler version.

4. The computer-implemented method of claim 1, further comprising:
   responsive to determining the metadata file for the compilation command request comprises the entry, executing a second process comprising:
      recording in a new temporary metadata file the compilation command request and additional compiler information, wherein the compiler information comprises:
         a compiler version, copying a list of optimizations that expressed no benefit in a previous compilation, and have no disable options from an original metadata file to the new temporary metadata file.

5. The computer-implemented method of claim 4, wherein the second process further comprises:
collecting from the original metadata file, a list of options to disable the optimizations that expressed no benefit exceeding a predetermined threshold in the previous compilation.

6. The computer-implemented method of claim 1, further comprising:
responsive to determining an original metadata file comprises an optimized compilation command, appending the option to the optimized compilation command stored in a new meta data file.

7. The computer-implemented method of claim 1, further comprising:
proceeding to a next optimization in an optimization queue;
responsive to completing the compilation, recording time taken between a start time and a stop time for the compilation in a new meta data file; and
replacing the entry for the compilation command requested in an original meta data file with an optimized compilation command in the new meta data file and deleting the new meta data file.

8. A computer system, the computer system comprising:
one or more computer processors;
one or more computer readable storage devices; and
program instructions stored on the one or more computer readable storage devices for execution by at least one of the one or more computer processors, the stored program instructions comprising:
program instructions to determine if there is an entry in a metadata file for a compilation command request; and
responsive to determining there is no entry in the metadata file, program instructions to execute a first process, wherein the first process comprises:
program instructions to initiate a compilation for a compilation unit;
program instructions to determine that the compilation has made a change to an input program within or below a predetermined threshold;
program instructions to determine that a compiler option used to disable an optimization is identified;
program instructions to record the compiler option to disable the optimization in the metadata file to a list of options to add and use in a next compilation;
utilizing the compilation command to collect data during compilation to be used in a subsequent optimization in a queue, wherein the collected metadata is utilized to highlight optimizations to deactivate; and
program instructions to disable the optimization based on the compiler option to disable in the metadata file.

9. The computer system of claim 8, further comprising:
responsive to determining there is no existing metadata file associated with the compilation unit for a compilation request, program instructions to create a new metadata file for the compilation unit; and
responsive to determining there is no entry for the compilation command request, program instructions to add an entry to the new metadata file for the compilation command request.

10. The computer system of claim 8, wherein the first process further comprises:
program instructions to record, in the metadata file, the compilation command requested and additional compiler information including compiler version.

11. The computer system of claim 8, further comprising:
responsive to determining the metadata file for the compilation command request comprises the entry, program instructions to execute a second process comprising:
program instructions to record in a new temporary metadata file the compilation command request and additional compiler information, wherein the compiler information comprises: a compiler version; and
program instructions to copy a list of optimizations that expressed no benefit in a previous compilation, and have no disable options from an original metadata file to the new temporary metadata file.

12. The computer system of claim 11, wherein the second process further comprises:
program instructions to collect, from the original metadata file, a list of options to disable the optimizations that expressed no benefit exceeding a predetermined threshold in the previous compilation.

13. The computer system of claim 8, further comprising:
responsive to determining an original metadata file comprises an optimized compilation command, program instructions to append the option to the optimized compilation command stored in a new meta data file.

14. The computer system of claim 8, further comprising:
program instructions to proceed to a next optimization in an optimization queue;
responsive to completing the compilation, program instructions to record time taken between a start time and a stop time for the compilation in a new meta data file; and
program instructions to replace the entry for the compilation command requested in an original meta data file with an optimized compilation command in the new meta data file and deleting the new meta data file.

15. A computer program product, the computer program product comprising:
one or more computer readable storage media and program instructions stored on the one or more computer readable storage media, the stored program instructions comprising:
program instructions to determine if there is an entry in a metadata file for a compilation command request; and
responsive to determining there is no entry in the metadata file, program instructions to execute a first process, wherein the first process comprises:
program instructions to initiate a compilation for a compilation unit;
program instructions to determine that the compilation has made a change to an input program within or below a predetermined threshold;
program instructions to determine that a compiler option used to disable an optimization is identified;
program instructions to record the compiler option to disable the optimization in the metadata file to a list of options to add and use in a next compilation;
utilizing the compilation command to collect data during compilation to be used in a subsequent optimization in a queue, wherein the collected metadata is utilized to highlight optimizations to deactivate; and program instructions to disable the optimization based on the compiler option to disable in the metadata file.

16. The computer program product of claim 15, further comprising:
responsive to determining there is no existing metadata file associated with the compilation unit for a compilation request, program instructions to create a new metadata file for the compilation unit; and
responsive to determining there is no entry for the compilation command request, program instructions to add an entry to the new metadata file for the compilation command request.

17. The computer program product of claim 15, wherein the first process further comprises:
program instructions to record, in the metadata file, the compilation command requested and additional compiler information including compiler version.

18. The computer program product of claim 15, further comprising:
responsive to determining the metadata file for the compilation command request comprises the entry, program instructions to execute a second process comprising:
program instructions to record in a new temporary metadata file the compilation command request and additional compiler information, wherein the compiler information comprises: a compiler version;
program instructions to copy a list of optimizations that expressed no benefit in a previous compilation, and have no disable options from an original metadata file to the new temporary metadata file; and
program instructions to collect, from the original metadata file, a list of options to disable the optimizations that expressed no benefit exceeding a predetermined threshold in the previous compilation.

19. The computer program product of claim 15, further comprising:
responsive to determining an original metadata file comprises an optimized compilation command, program instructions to append the option to the optimized compilation command stored in a new meta data file.

20. The computer program product of claim 15, further comprising:
program instructions to proceed to a next optimization in an optimization queue;
responsive to completing the compilation, program instructions to record time taken between a start time and a stop time for the compilation in a new meta data file; and
program instructions to replace the entry for the compilation command requested in an original meta data file with an optimized compilation command in the new meta data file and deleting the new meta data file.

\* \* \* \* \*